United States Patent [19]
Novak

[11] 3,715,812
[45] Feb. 13, 1973

[54] COLOR CODED PRONUNCIATION SYMBOL SYSTEM

[76] Inventor: Lorna Beth Novak, 2023 Street, Amarillo, Tex. 79109

[22] Filed: Dec. 7, 1970

[21] Appl. No.: 95,433

[52] U.S. Cl. .................................35/35 J, 35/71
[51] Int. Cl. ...............................G09b 17/00
[58] Field of Search .................35/35 J, 71

[56] References Cited

UNITED STATES PATENTS 683,267  9/1901  Froehlich.............................35/35 J
1,732,980  10/1929  Mooney..............................35/35 J X

FOREIGN PATENTS OR APPLICATIONS 622,219  1961  Canada ....................................35/71

Primary Examiner—Wm. H. Grieb
Attorney—Ely Silverman

[57] ABSTRACT

A color coded symbol system is applied to the letters of the English alphabet for such different language sounds as such letters have in different words to facilitate the pronunciation and reading and learning of such words.

9 Claims, 11 Drawing Figures

Our father,
which art in heaven,
Hallowed be thy name.
Thy kingdom come.
Thy will be done on earth,
as it is in heaven.

Aa snake ape ale fate

Aa smart arm father

Aa can grass am fat

Aa abide martha

C c
c
sounds like c
caesar
cement
cell
cease

Ch c
sh
sounds like sh
ocean
social
machine
moustache

FIG. 8 bursting

FIG. 9 bursting

FIG. 10 bursting

FIG. 11 bursting

| | | | |
|---|---|---|---|
| RED |  | PINK | |
| VIOLET | | PURPLE | |
| ORANGE |  | BROWN | |
| YELLOW |  | GREEN | |
| BLUE |  | TAN | |
| BLACK | | | |

INVENTOR.
LORNA B. NOVAK
BY

Ely Silverman
ATTORNEY

COLOR CODED PRONUNCIATION SYMBOL SYSTEM

BACKGROUND OF THE INVENTION

1. The Field of the Invention

The invention relates to printed matter and apparatus for imparting instruction and information for learning language.

2. Discussion of the Prior Art

After a child has reached the stage of understanding speech and of recognizing the letters of the English alphabet, the written or printed words chosen to be presented to the child for his learning thereof are orally pronounced by the teacher and repeated aloud by the child while the child follows along with his eyes the words so read and pronounced, and thus learns such words by rote. However, the sounds or pronunciation of even the words used by a child while first learning how to read as in "The Practice Workbook of Reading — Grade One" [by Treasure Books, a division of Grossett and Dunlap] do not all correspond to the sounds of each of separate letters of which such words are composed pronounced as single letters. For instance, even such simply worded sentences as "Here is Peter." do not pronounce the second letter "e" of the word "here", and the two different "e's" in the word "Peter" have a different pronunciation. Additionally, some letters in words never provide in the English language the sounds by which such letters are separately identified. For instance, the letter "w," pronounced as "double yew" is rarely so pronounced in words of the English language. Also, the letter "c", when pronounced in words in the English language, is pronounced sometimes as are the sounds of the letters "sh" and "k" [as in the words "ocean" and "cat"] and the letter "c" in "scent" and "scene" is not pronounced at all. The consonants "b", "f", "g", "s", "t", and "x" as well as the vowels "a", "e", "i", "o", "u", and the letter "y" also each have distinctly varied sounds in different common words and some thereof are silent in other words of the English language in which such letters appear, and words of even the same spelling have different sounds e.g., "read" (present tense) and "read" (past tense); further the letter "a" is pronounced differently in the word "duplicate", the verb and the word "duplicate", the noun. Further, the same sound is indicated by different letters, (as underlined) in some words of the English language, as "soda", "the", "fir", "demon", "picture", and "myrtle."

Because of the varied sounds of each of the letters, with no uniform relation of the visible alphabetic notations to the sound related thereto even in simple English language words as in the rhyme "Mary had a little lamb," the rote requirement of initial reading learning is high.

At the moment that a child is learning to read even the words usually available in such first grade type of text such child needs a clear understandable referent for the pronunciation of even such simple English language words. In such initial stage of presentation of sounds and letters which make up a word, analyses provided in standard works [as Websters New International DictionarY of the English Language, Second Edition, Unabridged, G. C. Merriam Co. Springfield, Mass., U.S.A. 1961 pages xxii through xxviii] are too long and too complicated for use by such child of insufficient vocabulary to identify and to apply such rules to words to be learned.

SUMMARY OF THE INVENTION

Written language, color and language sound are combined to supplement each other to facilitate learning of English language words and their pronunciation through use of a selected distinct colors applied to the letters of the English alphabet to identify the sound of each of such letters in the words in which they appear.

Confusion as to choice of varied pronunciation of letters in words is avoided by use of a color coded system of sound symbols wherein a distinct colored symbol is provided for each of the usual English language sounds without additional symbol outlines (than the standard English alphabet letters) and colors readily distinguished by the usual child in usual initial stage of learning to read and pronounce such words.

DESCRIPTION OF THE FIGURES

FIG. 8 shows each of the letters of a word underlined in color according to another color coded letter system of sound symbols of this invention.

FIG. 9 is yet another embodiment of color keying of the alphabet letter sound symbols according to this invention.

FIG. 10 is yet another embodiment of color keying of the alphabet letter sound symbols according to this invention.

FIG. 11 is yet another embodiment of color keying of the alphabet letter sound symbols according to this invention.

DESCRIPTION OF THE PREFERRED EMBODIMENTS

The preferred embodiment is a book, 10 which book comprises several pages of reading material as 11 and 12 and several pages of a phonics dictionary as 13 through 16. The reading material is composed of simple elementary text as 21 in the English language such as the nursery rhyme shown in FIG. 1 and familiar sentences in the conventional English language using readily known words, as in FIG. 2. The printed textual material as 21 is printed on substantially white paper or cloth sheets, as 17 on each page as 11 and 12, as is the printed material as 22 of the dictionary (on pages as 18) according to the color coded pronunciation symbol system or color coded letter system of sound symbols of this invention. The phonics dictionary is below described and portions thereof are illustrated in FIGS. 3, 4, 5, and 6. The pages of the book may be in loose leaf form or bound. The dictionary portion may be separate from the text portion. The contents of the dictionary illustrates the sounds to be pronounced by the symbols of the text portion.

According to the color coded symbol system for pronunciation of English language sounds provided herein there is a colored symbol for every sound of the English language with which the child initially comes in contact when learning to read and this symbol system clearly, using available letter outlines, distinguishes between the several sounds of each letter of the English alphabet in the text and demonstrates different letters pronounced by other sounds in the English language by other symbols. According to this system of color coded letter symbols for language sounds;

a. there is one group of chromatic colors used for the usual sounds (the sounds of letters being their pronunciations in the text words) of consonant letters and a second group of chromatic colors used for the usual vowel letter sounds with the colored members of the second group of chromatic colors being visually distinct from the members of the first group of chromatic colors and each of the members of the first group of chromatic colors being distinct from other members in that first group and each of the members of the second group of chromatic colors being distinct from other members in that second group of chromatic colors, b. letters pronounced by sounds other than the usual sounds of consonant letters and of vowel sounds are chromatically colored differently from each other and from the first and second group of chromatic colors, c. silent letters are written in black and, d. each of the sounds referred to in this color coded symbol system for language sounds is listed in alphabetical order of the letter used for such color coded symbol in the indexed phonics dictionary of the book to make the information provided for each of such sounds easy to locate.

Figure 7:
FIG. 7 indicates, for each of the hatchings provided in FIGS. 1 through 6, the color indicated thereby; details as to saturation and brightness of each such color are provided in Table II.
Figure 7:
Figure 7:
Figure 7:

The chromatic colors used in this color coded symbol system are shown diagramatically and referred to in terms of one or two syllables in FIG. 7 and are listed in Table II with standard color chart names therefor to describe such colors used in a particular preferred embodiment of this system in more detail as to saturation (or intensity) and hue and brightness (or value).

Figure 3:
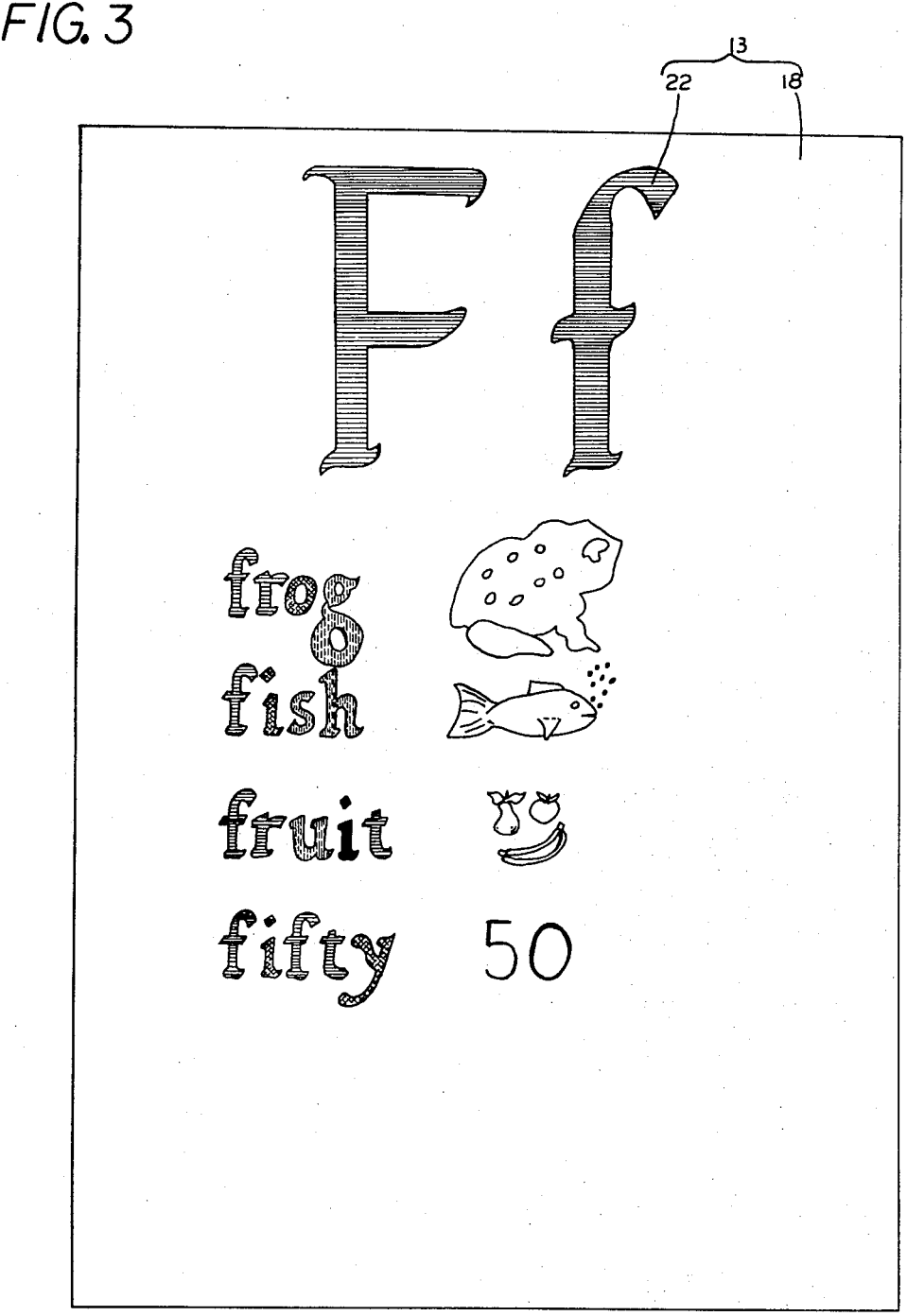
FIG. 3 is one page, 13, of a dictionary according to the color coded letter pronunciation symbol system of this invention, showing a page thereof for the letter "F" to illustrate one symbol of the coded letter system of sound symbols of this invention used with the text of FIGS. 1 and 2.

The contents of the indexed phonics dictionary are listed in Table I hereto; some dictionary page formats and contents are shown in FIGS. 3, 4, 5, and 6 and there are pictures by example as shown in FIG. 3 so that the child can teach himself to read. The contents of the indexed phonics dictionary may also include the silent letters, as set out in Table III, located in such dictionary in the number order indicated (i.e. symbol 6A follows symbol number 6, 10A follows 10, etc) for each such symbol.

This invention includes not only (1) the discovery and/or appreciation of the utility of the ability in a child not yet able to read his or her ability to: (a) recognize and distinguish different colors and (b) recognize and distinguish the outline of each of different English alphabet letters and, further, (c) to recognize the sounds of the English language oral vocabulary of such a child not yet able to read, but also, in view of such discovery and/or appreciation, (2) the creation of a system of language sound symbols combining the outlines of the letters of the English alphabet and preselected distinctive chromatic colors applied within such outlines to represent separate English language sounds, some of which language sounds do not correspond to the pronunciation of the alphabet letters; this color coded letter system of language sound symbols provides pronunciation guides without changing the spelling of the words to be learned by the child or requiring additional symbol or letter outlines.

Figure 1:
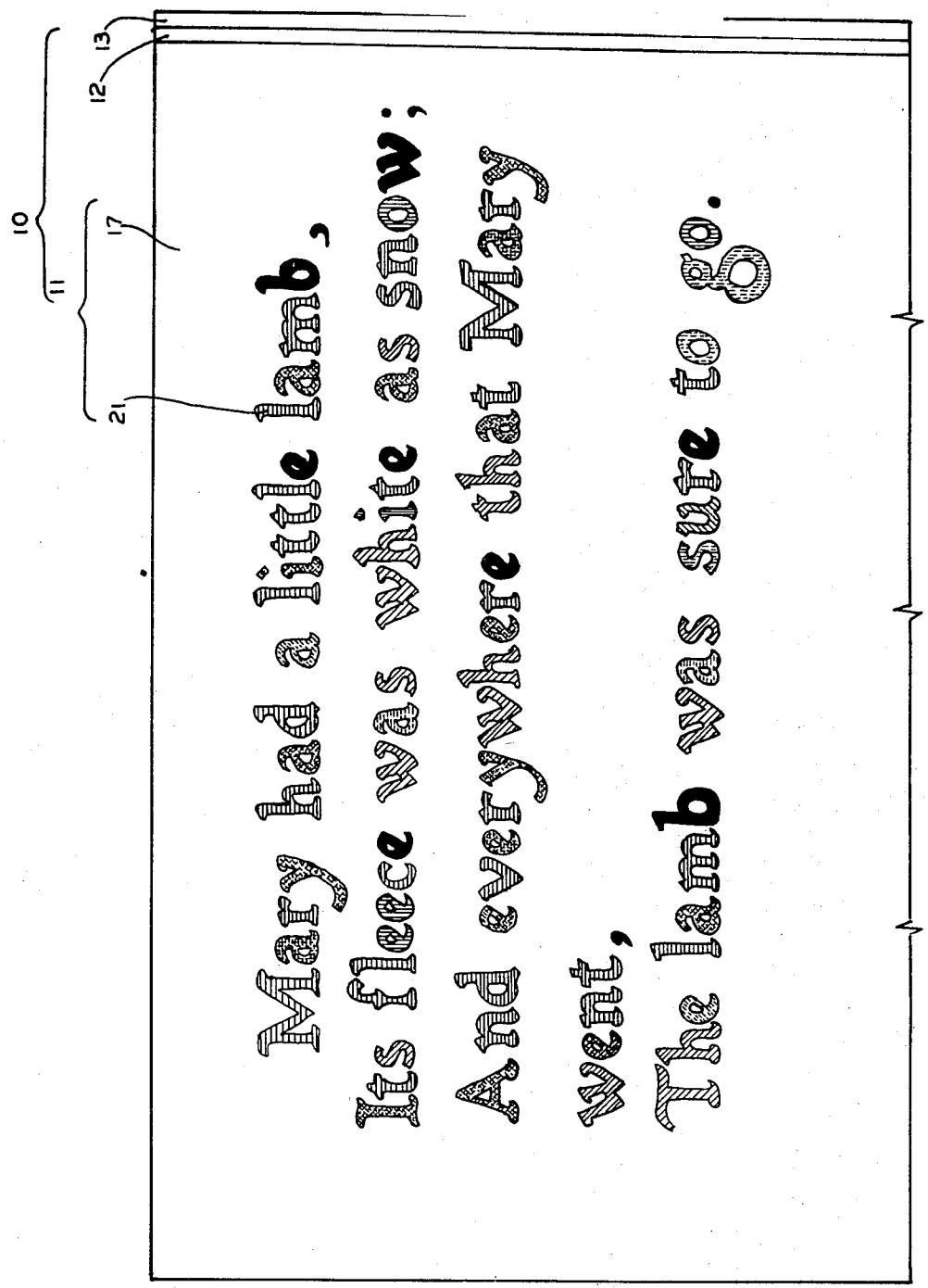
FIG. 1 shows a children's rhyme in the English language on a page, 11, of a book, 10 according to this invention, on which page the letters of the words of the rhyme are colored according to a color coded letter system of sound symbols according to one embodiment of this invention.

FIG. 1 is illustrative of a page of the text portion of an embodiment of color coded letter system of language sound symbols. Each of the variations of pronunciation of each particular English alphabet vowel letter therein has applied thereto a different distinctive color i.e., has a distinctive hue, saturation and/or brilliance; each vowel letter has one principal color, red, corresponding to the sound of that letter when it stands alone [as "a" in "ape"] and each of the common variations of the pronunciation of such vowel letter as "a" in "lamb", "father", and "abound" are provided distinctly different characteristic colors as shown in FIG. 4 for "am", "smart" and a"sofa" respectively.

Figure 4:
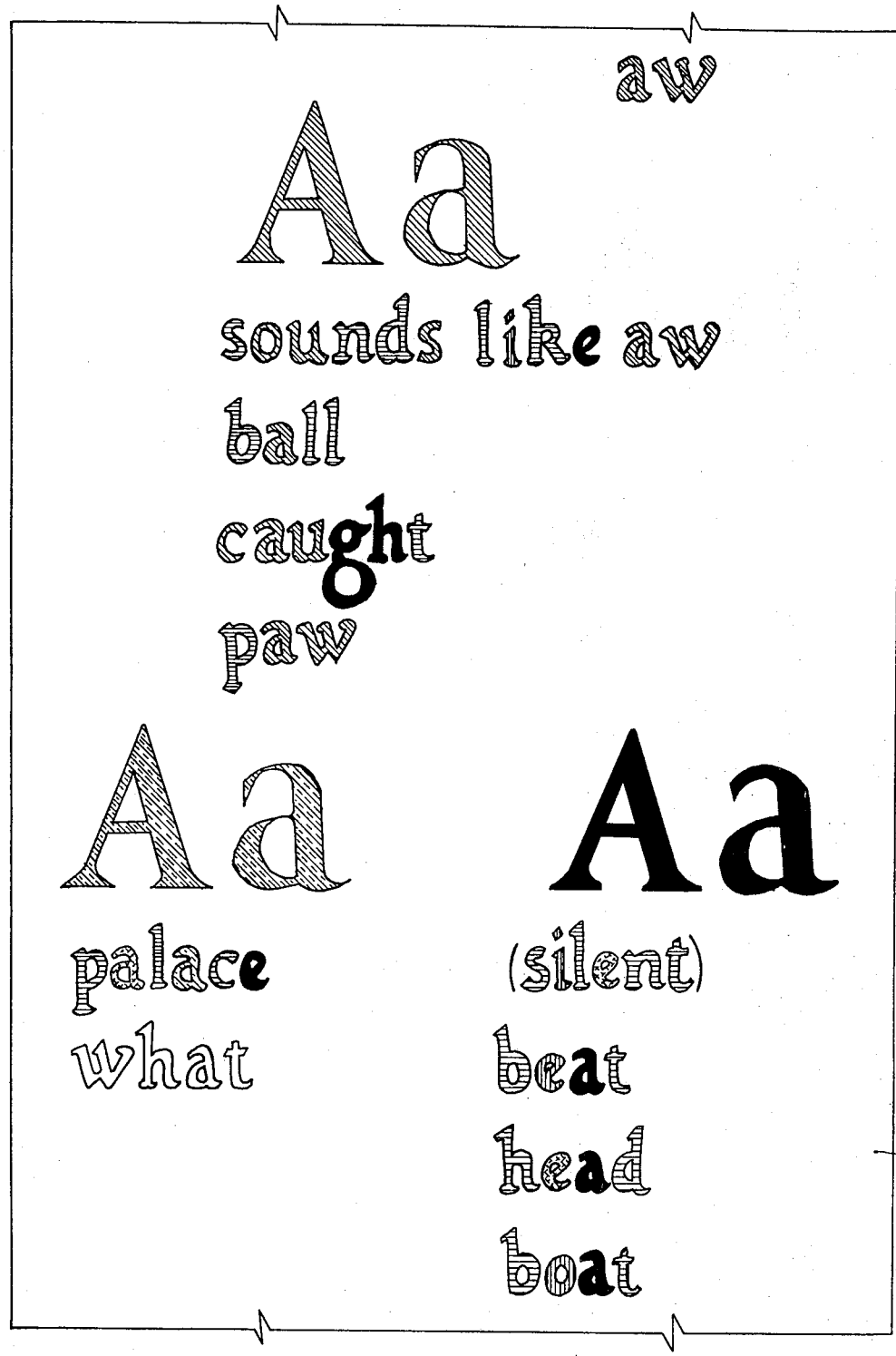
FIG. 4 is another page, 14, of a phonics dictionary, according to the color keyed letter system of sound symbols of this invention, for pronunciation of words with the letter "A" with the text of FIGS. 1 and 2. This FIGURE is in several parts, all forming one page.
Figure 4:
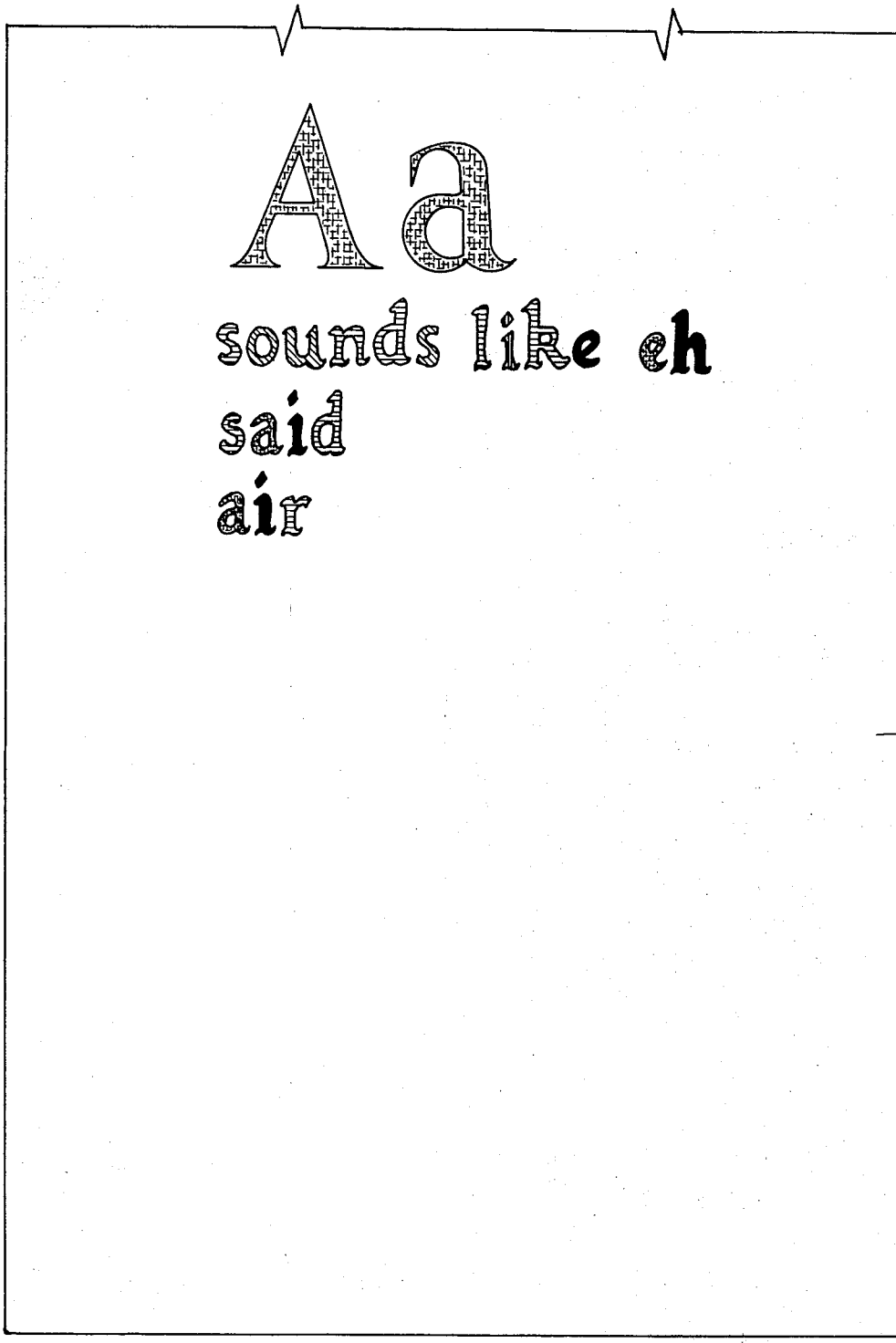

As shown in FIG. 4, while the chromatic color symbol of the vowel letter "a" corresponds to the pronunciation thereof as in the English language words "snake", "ape", "ate", "fate", and "Mary", that vowel letter symbol is modified by variations in color only, e.g., red, orange, brown, and pink as shown in FIG. 1 so that in the words of the reader or text portion of this invention, as shown in FIG. 1, such coded coloring of each alphabet letter symbol positively indicates the correspondingly properly varied pronunciation of such vowel letter in each of such words. Similarly, in the English language many of the consonant letters are pronounced by not only the sound of the letter standing alone, as "g" in the word "gem", but also variations thereof as the green "g" in "go" of FIG. 1; however the beginning reader child using the text portion may notice that the consonant letters in a color distinctly other than blue and such reader thus know by such differently colored symbol that such letter as "g" is used in that word, as "go" of FIG. 1, with a sound different from the sound of such letter ("g") standing alone and may refer to the index for the proper pronunciation of such letters as in the word "go" of FIG. 1: such a child is similarly apprised that the pronunciation of the blue colored letter symbol "c" in the word "fleece" of FIG. 1 is different than the pronunciation of the green English alphabet letter "c" in the word "come" in FIG. 2 and accordingly, by his or her use of the dictionary portion (items 10 and 11 of Table I), is positively apprised of the proper pronunciation of the letter "e" in the word "fleece" as well as apprised to avoid pronouncing the sound corresponding to the green "C" in "come."

Figure 2:
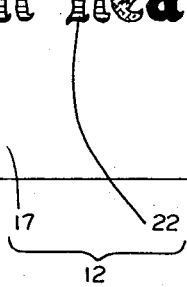
FIG. 2 shows a Biblical verse in the English language with the coloring of its letters according to the color coded letter system of sound symbols of this invention.

The coloring of the lettering shown in FIGS. 1 and 2 illustrates the coloring of symbols in this color coded symbol system for sounds to call to the attention of the very young reader not only when a given letter is not pronounced with the sound of the separate letter of which such word is composed but also the invention provides a color coded letter symbol system of sound symbols to positively indicate the proper sound for each letter in each word.

Figure 5:
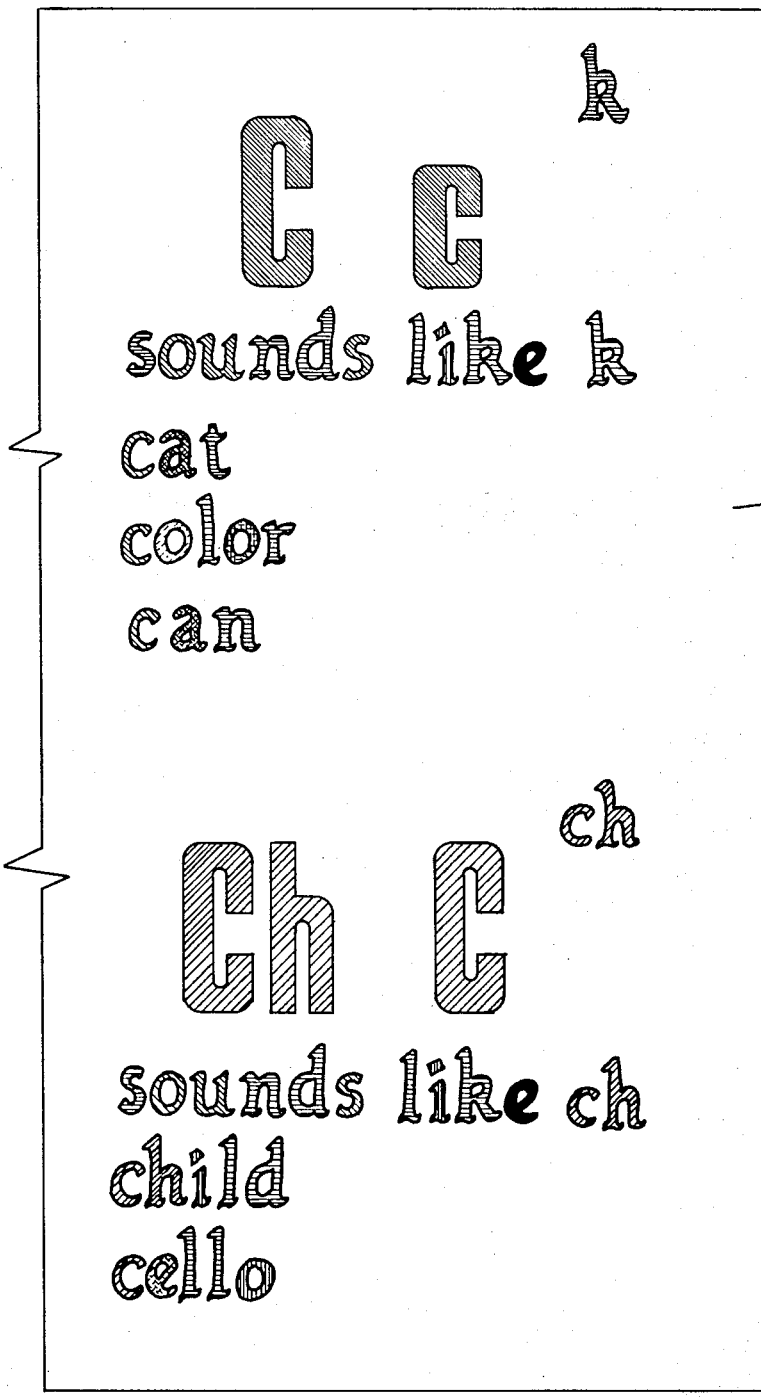
FIG. 5 is another page, 15, of a color coded phonics dictionary according to the color keyed letter system of sound symbols of this invention for the letter "c" as used in FIGS. 1 and 2.

According to the invention herein each of the English language sounds is illustrated by words on pages in the phonics dictionary portion of the book; these pages are arranged in the alphabetical order of the English alphabet letter the outline of which is used and the area within which outline is chromatically colored, the order of such sounds is set out in Tables I and III; information for pronunciation of each of the separate sounds pronounced on basis of one letter outline may be on one page as shown in FIG. 3, or all of the separate sounds symbolized by filling in the outline of one letter by varied colors may be presented on one page as for the letter "a" in FIG. 4 and the letter "c" in FIG. 5, in the first portion of this phonics dictionary. Also, as there is by this system of sound symbols a color for every sound, such generally alphabetical list of varied sounds of pronunciation of alphabet letters is followed by separate phonics dictionary pages each illustrating, respectively, sounds pronounced by letters and combinations of letters which sounds do not correspond to the pronunciation of any one English alphabet letter, herein referred to as non-alphabet language sounds, such as the "ch" sound and the "sh" sounds.

Figure 6:
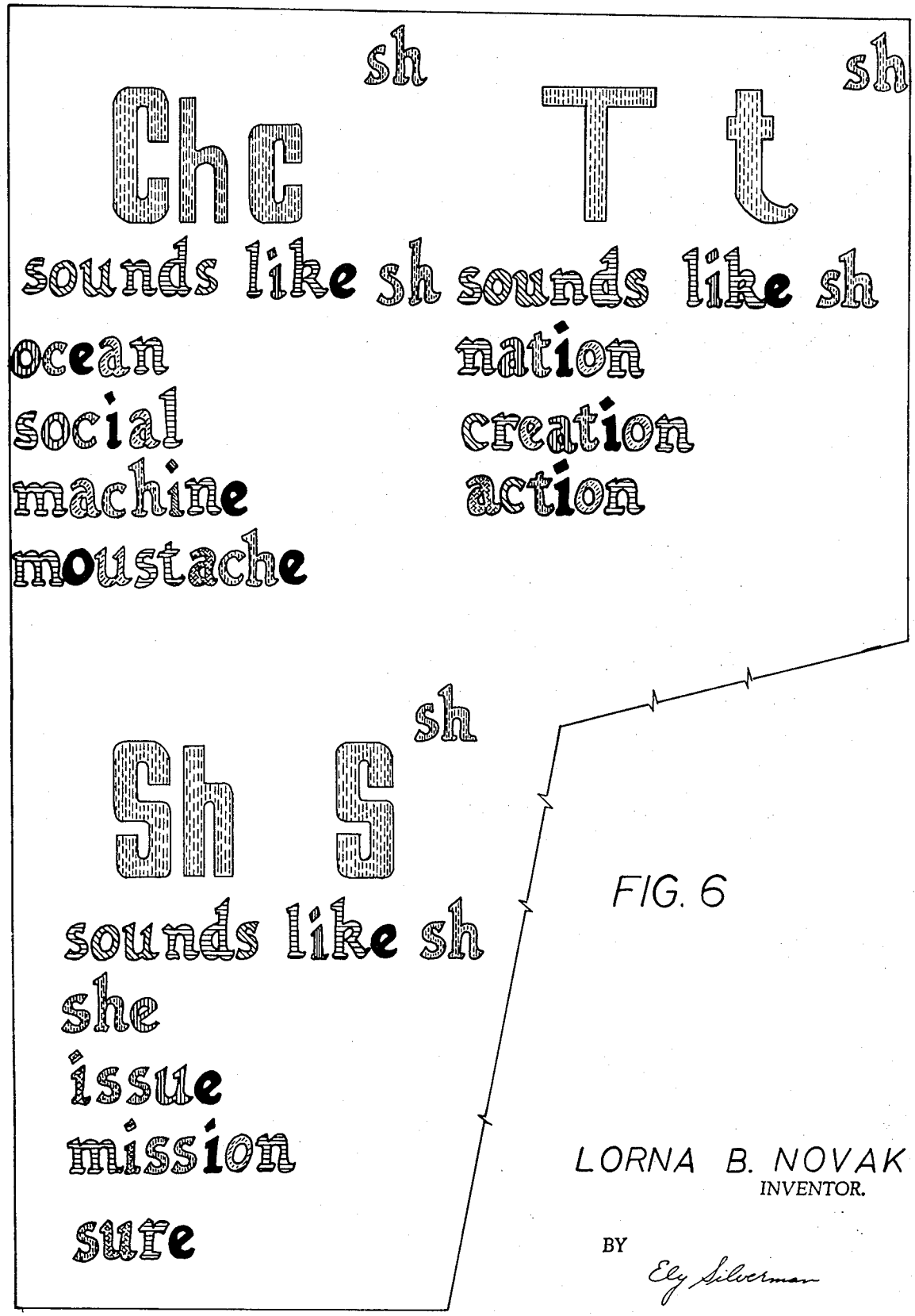
FIG. 6 is another page, 16, of a dictionary according to the color keyed letter system of sound symbols of this invention for the sound "sh."

Accordingly, the dictionary includes as a second portion;
  a. pages with words having letters pronounced with the "ch" sound and which letters are, in this embodiment colored brown and
  b. on yet another sheet, the words with the letters colored purple in this embodiment of this system pronounced with the "sh" sound as in FIG. 6 and
  c. on yet another page the words having letters pronounced by the "uh" sound and colored tan in this embodiment.

The information on each of such dictionary pages illustrating such non-alphabet sounds, as in FIG. 6, presents the same information relative to each such non-alphabet sound and the colored letters forming such sound, (as the "sh" sound formed by the letter "c") as is presented in the portion of the dictionary pages (as FIG. 5) demonstrating that non-alphabet sound when formed by each of the separate alphabet letters, (as "s", "c", and "t",) forming such "sh" sounds. Thereby the different letters which form the same sounds, which sounds are not sounds provided by the letters of the alphabet standing alone, are grouped together for the convenience of the reader, and the chromatic coloring thereof demonstrates the similarities of each such sound regardless of the English alphabet letters used as basis for spelling of words pronounced with such non-alphabet sound. The content of each indexed dictionary page comprises, as shown in FIG. 3, a heading and words illustrative thereof. The heading is a colored alphabet letter which refers to a particular English language sound which sound such dictionary page is designed to illustrate as in FIGS. 3, 4, 5, and 6. Below the heading as "Ff" in FIG. 3, there are words such as "from" and "fish" which contain the colored English alphabet letter "f" shown in the heading and which letter in such illustrative words is colored identical to the color of such English alphabet letter in the heading on such page. The words are chosen so that the pronunciation of such English alphabet letters in such words are illustrative of the sound of the colored letter in the heading.

FIG. 4 is an illustration of the treatment given in the dictionary to the sound symbols based on the English alphabet letter "a." Each of the several separate language sounds or pronunciations for which the letter "a" is used is illustrated by words wherein the pronunciation of that same letter occur. In each of such words the letter "a" is contained and in each of such words such letter is colored with a distinctive chromatic color characteristic of the sound which pronunciation of such letter produces in such words. Thus, to illustrate the sound of the vowel letter "a" as in the words "ate" and "fate" as well as in the words "snake" and "ape" such words are shown together in FIG. 4 with and in proximity to the letter "a" in the heading with the letter "a" always in the same distinctive color. The pronunciation of words such as "ate", "fate", "snake", and "ape" are words illustrative of such sound and the letter "a" is shown colored in the same color, red, in each of such words and each of such words are located in close spatial relationship to, i.e., under and near to and on the same page as, the letter "a" in the heading while other letters representing other sounds in such words, as the "k" in "snake" and the "n" in "snake" and the "s" in "snake" are in another color, blue, distinct from red, and the "e" in "ape" and "fate" are in black, also distinct from red.

For each of the consonant letters, such as "c", which is pronounced with differing sounds in different words each such language sound is illustrated in the dictionary as is shown in FIG. 5 for the letter "c". Words pronounced with the sound of pronunciation the letter "c" that sounds like an "s" as in "cement" and others pronounced with a sound like "k" as the "c" in "cat" and other words pronounced with a sound which sounds like "sh", as in the word "ocean" or "social", are provided as illustrative of such sounds, and the letter "c" is characteristically colored in each of such words that produces each such sound and each such (first) characteristic color is distinct from a second characteristic color of that letter where some other (second) sound than said one sound corresponds to its pronunciation.

Each of the sounds of the other consonant letters of the English language are similarily so illustrated on their respective pages of the dictionary to provide a referent for such information. Each of the sounds are demonstrated by the use of a word chosen to represent the pronunciation of such English alphabet letter in such words. Each of such dictionary pages are arranged in alphabetical order of the color letter used as an outline for the colored portion thereof so that such colored sound symbol may be readily located by the user, i.e., the reader, of the book.

The sounds and symbols for each of the separate different sounds of the English language are set out on each of the separate different pages of the dictionary as listed in Table I and III herebelow and the content or layout of each of such dictionary pages is illustrated in FIGS. 3, 4, 5, and 6.

The array of symbols and words in FIG. 3 is typical of the information and presentation thereof for each of the sounds of the English alphabet consonant letters, when such consonant letters are colored blue. The array of symbols and words in FIG. 4 is typical of the presentation for each of the English alphabet vowel letters that are pronounced with varied sounds in different words. The array of colored letter symbols and words of FIG. 5 is typical of the presentation of such color coded letter system of sound symbols for each of the consonants that have different sounds in different words. The array or format or layout of the colored letter symbols and words of FIG. 6 is typical of the presentation for each of the pages of the dictionary which illustrates a particular sound, the "sh" sound in this case, when such sound is symbolized by any or all of a plurality of English alphabet letters. It will be noted that, notwithstanding that different letters are used, all of these letters are given the same color, purple in this case; accordingly that one color i.e., that one combination of hue, brilliance, and saturation indicates the pronunciation for that (non-alphabet) sound.

According to the color coded letter sound symbols system of this invention each of the five English alphabet vowel letters "a", "e", "i", "o", and "u", when pronounced in words as such English alphabet letter is pronounced when such letter is a separate letter is shown colored red as defined in Table II and as in the words as shown in FIGS. 1 and 2 and 4 and in Table I for the red coloring of such letter.

Three vowel letters "a", "o", and "u", in certain words, such as "arm", "food", and "true" respectively, are pronounced by sounds which are commonly referred to as "long" sounds of such vowel letters: these vowel letters are colored violet according to the color coded sound letter symbols system of this invention when such English alphabet vowel letters are pronounced by such sound in the words in which such vowel letter appears.

The "short" sounds of each of the vowel letters of the English alphabet are indicated by coloring each of such letters orange in words containing such vowel letters pronounced with such "short" sounds as the letter "a" in the word "man", the letter "e" in the word "end", the letter "i" in the word "ill", the letter "o" in the word "not", and the letter "y" in the word "myth." Such coloring is in a distinctive color, orange in this particular embodiment, of the particular brilliance, saturation and hue shown in FIG. 7 and Table II. It will be noted that by any one coloring of the letter "a", regardless of the sound which it represents as in FIG. 4 is clearly distinct from any of the other colors applied within the outline of such English alphabet letter colored symbol, to be clearly distinct from any of the other colored symbols using the same color outline.

The "uh" or grunting sound is created or pronounced for words containing one or another of all of the English alphabet vowel letters "a", "e", "i", "o", and "u." Accordingly as this one, "uh", or grunting sound is not always indicated by any one English alphabet vowel letter and is a sound not created by pronunciation of only one English alphabet vowel letter, the English alphabet letters which provide such sounds in a given English language word, according to the color coded sound symbols system of this invention are, in such words, each provided in a characteristic, distinctive color, tan in the particular embodiment of this invention herein shown in FIGS. 1 through 6 as illustrative of this invention.

When one, first vowel letter in a word has one particular sound of another, second, vowel letter (whether shown as e.g., red, violet, or orange for such second vowel letter according to this system) such pronunciation of the first vowel letter creates no new sound and, according to the color coded sound symbol system of this invention, the coloring of that first English alphabet letter is colored a distinctive and characteristic color, pink in the preferred embodiment, to be distinct from the other colors applied within the outline of that one English alphabet vowel letter for other sounds or pronunciations of such one first letter. A visual distinction is thus provided between the color of such first English alphabet vowel letter when it is so pronounced like a particular sound of another vowel and the color of that first English alphabet vowel letter when it is pronounced in a manner corresponding to when that vowel is colored red, orange, or violet; examples of such pink lettering are at items 6, 20, 31, and 46 of Table I wherein such pink symbol utilizing the first vowel letter outline is, in the preferred embodiment, directed only to such one sound of the second vowel letter.

As illustrated in the FIG. 4, when vowel letters occur in words which are pronounced with sounds similar to the sounds of other, consonant letters of the English alphabet such vowel letters are colored green: for instance, the letter "a" in the word "ball" (wherein a sound like "aw" is pronounced), and the letter "o" in the word "choir" (wherein the "o" is pronounced with a "wh" sound), are colored green.

Because of the large number of different sounds by which the letter "y" is pronounced, such letter is colored with any one of a variety of colors to provide distinctly differing symbols corresponding to each of such different sounds as listed as items 74 through 77 in Table I.

Each of the consonant letters "b", "c", "d", "f", "g", "j", "k", "l", "m", "n", "p", "r", "s", "t", "v", "x", "y", and "z" is colored blue when such consonant letter (in given words) is pronounced with a sound corresponding to the sound of such consonant letters standing alone as provided in the words in the phonics dictionary (listed in Table I) and shown, as an example, in FIG. 3.

When each of the consonant letters "c", "d", "f", "g", "j", "n", "p", "q", "s", "w", and "x" is pronounced in a given word with a sound which simulates the sound of another consonant such letter symbol is colored green, as is the case for the coloring and pronunciation of the letter symbol "f" in the word "of" according to this color coded letter system of sound symbols because, in such case the sound of the consonant letter "v" (not "f") is simulated. Similarly, for the letter "d" in the word "soldier" wherein the sound of the letter "j" is simulated, the letter symbol "d" is colored green as is the letter "c" in the word "cat" in FIG. 5 and in the word "come" in FIG. 2, wherein the sound of the letter "k" is simulated. The letter "h" is colored blue when pronounced as is the first letter in "hat" because of the uniqueness of the sound of the letter "h" as in the word "hat" and the common pronunciation of the letter "h" in the word "hat" as well as because of the distinct coloring of "h" according to this system of color coded letter symbols in the symbols for the sounds of "wh", "ch", "uh", and "sh" notwithstanding the inapplicability of the use of its pronunciation ("aitch") to the letter "h."

As the sound "ch" in the word "child" is indicated by different letters in different words, as the letter "t" in the word "question" and by the letter "c" in the word "cello" as well as by the letters "ch" in "cheek", and the "ch" sound is not produced by the pronunciation of any one letter of the English alphabet standing alone, the letters which are pronounced with such "ch" sounds are given a separate, distinctive, color which is brown according to the color coded sound symbol system of this invention in the preferred embodiment.

As the "th" sound as it occurs in the word "with" is a variation or a lisp of the sound of the letter "s" the letters forming the "th" sound are colored green as shown in FIG. 2 and in Table I.

The letters which are pronounced as the "sh" sound, e.g., the letter "s" in the word "sure", the letter "t" in the word "nation" and the letter "c" in the word "ocean" as well as the letters "ch" in "machine" are, according to the color coded letter symbol system of this invention provided, in such words, in a characteristic distinctive color, purple. The saturation of this color is distinctly different from the violet, which is a much lighter color, used for sounds as 42 and 64 of Table I.

Accordingly, 35 main different sounds of the English language are represented by a total of 66 coded letter symbols for sounds, and these 66 symbols are represented by 26 English alphabet letters and eight different chromatic hues, each of three of which hues are used in two distinctively different degrees of saturation, for a total of ten different chromatic colors and black.

The sounds of the English alphabet are thus indicated by characteristic colored letters of the English alphabet in this color coded sound symbol system and, a. the full range of 23 sounds provided by the outlines of the letters of the English alphabet themselves are used without changes in spelling of the words or capitalization or punctuation and, b. an extension of such alphabet outline symbols by use of seven different additional distinct colors not only provides a distinction from the 23 sounds provided by the pronunciation of the letters of the alphabet standing separately but such extension also provides, a distinctive chromatic color notation for each of 11 sounds of the English language which are not made by pronunciation of the letters of the English alphabet by themselves and, c. when use of violet and purple and brown are as hereinabove described are interchanged (as the choice of colors in the separate groups of distinct characteristic colors hereinabove referred to, [at page 7, line 1 to page 8 line 6] is a matter of choice) by the use of two additional distinctive colors not only are each of 35 sounds of the English language readily recognized by the beginning reader as those sounds in the English language which do and those which do not have their sounds expressed by the letters of the English alphabet standing alone but, also this system provides for a grouping of the letters in a given word according to the syllables in which such letters occur as differently colored consonants and vowels provide groupings that represent syllables that readily indicate to the reader where the consonants and the vowels are located, the consonants being in the cool colors, blue, green, dark purple, and violet while the vowel symbols are in the warmer colors (when use of violet and pink are interchanged.

This color coded sound symbol system thus provides meaningful application of the above mentioned inventive discovery of the ability of a child not yet able to read to recognize colors he or she had already learned and sounds which he had already learned and so apply his or her theretofore limited vocabulary and memory thereto.

This process or system of sound symbols is, by use of the words in syllabic units and combining the words in such units to form a readable text and copying of such text by color video tape, utilized with little human intervention to provide such text to the view of very many people as well as, by storage of the tape by conventional means therefor, permit readily and repeated use of such text with colored letters. Color recognition may be by the human eye using color standards or by photo electric matching procedures using standard light sources and standard filters.

The color coded sound symbol system of this invention may, in another embodiment where chromatically colored and black dots are used under each of the letters of the text, as in FIG. 8 use conventional black printing with such colored dots thereunder as color coded symbol for pronunciation of the letters thereabove in such words. Also, colored and black dashes may be used under each letter as shown in FIG. 9 with the same colors as heretofore discussed for each of the letters in the words as color coded symbols for pronunciation with the color coding being as above described and in Table I.

FIG. 10 of the drawings illustrates another embodiment of the invention wherein an area in back of each letter is colored in pastel i.e., colors of low saturation and of low brilliance, as background and the letters used are the letters of the English alphabet and are printed black and stand out clearly against such pastel background. The pastel coloring is the same for each of the letters of the alphabet as against each of the sounds listed in Table I as is provided for in the relationship above described for the FIGS. 1 through 7.

FIG. 11 shows each of the letters in the word surrounded by a colored block, the block is hollow so that the coloring of the border follows the color relations herein above described for each of the letters of the English language sounds in relation to the English alphabet letters symbols therefor as in FIGS. 1 through 7.

The system of letter coloring shown in FIGS. 1 through 6 is the preferred embodiment of the invention inasmuch as there is no change of the letter outlines and such is most amenable and practical in view of present methods of multicolor printing and present method of color television and magnetic tape recording for television as well as that it provides that there is no additional material presented to the eye of the child other than the English alphabet letters themselves and the coloring thereof. Pastel coloring is difficult of contrast control; it is difficult to create adequate alignment for perfect outlining as in FIG. 11 and such additional outlines are distracting.

It is to be understood that the drawings herein provided are drawn to a substantially enlarged scale so that the hatching illustrative of the colors shown may be illustrated. In actual practice the letters such as in FIGS. 1 and 2 would, in normal course of events each between one-quarter and one-half inch high and the letters in the headings of FIG. 3 through 6 would be between one-half and three-quarters inch high while the explanatory material in the text would be about one-quarter inch high as this is adapted for children's reading. The particular size of the letter could be further reduced to standard elite capital letters in typewriter size. While the above description used eight hues that were particularly distinct and two different degrees of saturation to represent different sounds, additional distinct hues could be used for the sounds and the degree of saturation of color of each sound used for emphasis to aid in proper pronunciation where needed.

TABLE I

TABLE OF SOUND SYMBOLS

| No. | heading | Color[1] | Subheading | Words |
|---|---|---|---|---|
| 1. | Aa | red | | ale, fate, snake, ape |
| 2. | Aa | violet | | arm, father, are, small |
| 3. | Aa | orange | | am, can, fat, grass |
| 4. | Aa | tan | uh[2] sound | sofa, idea, account |
| 5. | Aa | yellow | sounds like 17 | said, air |
| 6. | Aa | pink | sounds like 29 | palace |
| 7. | Aa | green | sounds like aw[2] | all, ball |
| 8. | Bb | blue | | baby, be, but |
| 9. | Cc | purple | sounds like sh[2] | ocean, social |
| 10. | Cc | dark brown | sounds like ch[2] | cello, child |
| 11. | Cc | green | sounds like K[3] | cat, can, cup |
| 12. | Cc | blue | | cell, cease, cement |
| 13. | Dd | green | sounds like J[3] | soldier, educate |
| 14. | Dd | blue | | day, den, do |
| 15. | Ee | green | sounds like 77 | ewe |
| 16. | Ee | red | | he, she |
| 17. | Ee | orange | | end, met, pet |
| 18. | Ee | tan | sounds like uh[2] | the, earth |
| 19. | Ee | yellow | | reader, maker |
| 20. | Ee | pink | sounds like A[4] | they, prey |
| 21. | Ee | violet | | deer, here |
| 22. | Ff | green | sounds like V[3] | of |
| 23. | Ff | blue | | frog, fill |
| 24. | Gg | purple | | go, begin |
| 25. | Gg | blue | sounds like J[3] | gem, giant, religion |
| 26. | Gg | brown | sounds like ZH | rouge, genre |
| 27. | GHgh | green | sounds like F | laugh, cough |
| 28. | Ii | red | | ice, bite, idea |
| 29. | Ii | orange | | ill, pity, with |
| 30. | Ii | tan | | fir |
| 31. | Ii | pink | sounds like E[4] | unique, pique |
| 32. | Ii | green | sounds like 77 | oil, noise, voice |
| 33. | Jj | green | sounds like Y[3] | hallelujah |
| 34. | Jj | blue | | joke, jolly, jump |
| 35. | Kk | blue | | keys, kick |
| 36. | Ll | blue | | late, leg, lip |
| 37. | Mm | blue | | man, mine, mold |
| 38. | Nn | blue | | no, man, many |
| 39. | Nn | purple | | bank, song |
| 40. | Nn | brown | | bon, ensemble |
| 41. | Oo | red | | old, note, row |
| 42. | Oo | purple | | to, two, food |
| 43. | Oo | orange | | odd, not, forest |
| 44. | Oo | yellow | | lord, ordain |
| 45. | Oo | tan | sounds like uh[2] | demon, nation |
| 46. | Oo | brown | | wood, good |
| 47. | Oo | green | sounds like w[2] | choir |
| 48. | PHph | green | sounds like f[3] | telephone, triumph |
| 49. | Pp | blue | | pat, pen, pin |
| 50. | Qq | green | sounds like k[3] | quick, queen |
| 51. | Rr | blue | | run, rabbit |
| 52. | RHrh | green | | rhomboid, rhododendron |
| 53. | SHsh | purple | sounds like sh[2] | sure, issue, mission |
| 54. | Ss | green | sounds like z[3] | is, wise, lives, ears |
| 55. | Ss | blue | | sit, fast, seen |
| 56. | Ss | brown | sounds like zh | pleasure, unusual |
| 57. | Tt | purple | sounds like sh[2] | nation, action, caution |
| 58. | Tt | brown | sounds like ch[2] | question, righteous |
| 59. | THth | green | | then, with |
| 61. | Tt | blue | | time, talk, Thomas |
| 62. | Uu | brown | sounds like 46 | put, could, sure |
| 63. | Uu | red | | cube, unite, menu, music |
| 64. | Uu | purple | | rude, blue, rumor |
| 65. | Uu | green | | persuade, sound |
| 66. | Uu | tan | | circus, under, up, picture |
| 67. | Uu | yellow | | urn, furl |
| 68. | Vv | blue | | vote, vent, vile |
| 69. | Ww | purple | | yew, blew, new |
| 70. | Ww | green | | want, win, wood |
| 60B | Ww | pink | sounds like 63 | few, pew |
| 71. | WHwh | green | | what, why, which |
| 72. | Xx | green | sounds like z[2] | Xerox, xylophone |
| 73. | Xx | blue | | except, exit exact |
| 74. | Yy | red | sounds like i[4] | shy, by, cry |
| 75. | Yy | orange | sounds like 29 | myth, hymn |
| 76. | Yy | yellow | sounds like 19 | myrtle, martyr, myrrh |
| 77. | Yy | green | | yet, yellow, yard |
| 78. | Zz | blue | | zone, haze |
| 79. | Zz | brown | sounds like zh | azure, glazier |
| 80. | | black | silent | head, sure, right, write[6] |

1 Color is applied to heading and underlined letters in "words" column, as shown in FIGS. 3, 4, and 5.
2 Same color applied to underlined letter in this column as in "words" column.
3 Same color, (blue) applied to underlined letter in this column as applied to consonant that sound like itself e.g. "K".
4 Underlined letter is to be printed in red.
5 Underlined letter is to be printed in orange.

TABLE II

| Name FIG. 7 | PANTONE Matching System* | Webster Color Chart |
|---|---|---|
| Red | Warm red [between 177 and 179] | English Vermillion No. 130 |
| Violet | 245=2 ¼ parts purple 1 ¾ parts rhodamine red 12 parts white | Mallow Purple No. 103 |
| Orange | 150=6 parts yellow 2 parts warm red 8 parts white | Cherry No. 132 |
| Yellow | Yellow [between 102 and 103] | Lemon Carome No. 46 |
| Pink | 211=3 parts rhodamine red 1 part warm red 12 parts white | Mallow Pink No. 102 |
| Brown | 469=6 parts warm red 1 part reflex blue 9 parts yellow 4 parts black | Plum No. 101 |
| Purple | 254=16 parts purple 1 part black | Royal Purple No. 149 |
| Green | 347=10 parts process blue 6 parts yellow | Shamrock Green No. 15 |
| Blue | Process blue [between 306 and 307] | Italian Blue No. 82 |
| Black | Process black | Black |
| Tan | 160=12 parts yellow | Maroon |

| | |
|---|---|
| 4 parts rubine red | No. 133 |
| 1 parts black | |

*from the PANTONE Matching System (PMS) book of colors for color control: PANTONE is a registered trademark of Pantone Inc., 461 Eighth Avenue, New York, New York, 10001: these colors in this Table II are those on coated paper.

TABLE III

| Number | Heading | Color¹ | Subheading | Words |
|---|---|---|---|---|
| 7A | Aa | black | silent | beat, head, boat⁶ |
| 8A | Bb | black | silent | debt, lamb, comb, climb⁶ |
| 11A | Cc | black | silent | scene, scent⁶ |
| 14A | Dd | black | silent | fudge, edge, Wednesday⁶ |
| 20A | Ee | black | silent | little, home⁶ |
| 24A | Gg | black | silent | gnaw, although⁶ |
| 26A | Hh | black | silent | which, hour, honor, light⁶ |
| 31A | Ii | black | silent | receive, field⁶ |
| 34A | Kk | black | silent | knife, knot, know⁶ |
| 35A | Ll | black | silent | calf, half, should, could⁶ |
| 36A | Mm | black | silent | mnemonic, mnium⁶ |
| 37A | Nn | black | silent | column, condemn⁶ |
| 46A | Oo | black | silent | rough, trouble, gaol¹⁶ |
| 48A | Pp | black | silent | psychology, pneumonia, psalm⁶ |
| 54A | Ss | black | silent | island, aisle⁶ |
| 60A | Tt | black | silent | match, stitch⁶ |
| 65A | Uu | black | silent | guess, although⁶ |
| 69A | Ww | blace | silent | answer, whose, write, show⁶ |

6 Underlined letter is black, all other letters are colored.

I claim:

1. An array of color coded letter symbols for language sounds comprising words formed by alphabet letters, said letters being in distinctly different characteristic chromatic colors, said letters each having more than one characteristic chromatic color, and said words are presented with each such different particular characteristic color of each such letter corresponding to a different particular pronunciation thereof.

2. A dictionary as in claim 1 wherein the alphabet letters are English alphabet letters and the words are printed in the alphabetical order of letter outlines used for such sound symbols.

3. An array of color coded letter symbols for language sounds as in claim 1 comprising also a plurality of multi-member groups of chromatic colors and wherein one multi-member group of chromatic colors is used for the pronunciations of each of a plurality of consonant letters so colored and a second multi-member group of chromatic colors used for the pronunciations of each of a plurality of different vowel letters so colored, with the colored members of the second group of chromatic colors being visually distinct from the members of the first group of chromatic colors and each of the members of the first group of chromatic colors is visibly distinct from other members in that first group and each of the members of the second group of chromatic colors is visibly distinct from other members in that second group of chromatic colors and silent letters are written in black and wherein each consonant letter pronounced by a sound other than the usual pronunciation of such consonant letter standing alone is, for each such different pronunciation thereof chromatically colored differently from the color accorded such consonant letter standing alone and differently from the coloring accorded each other different pronunciation of such letter and chromatically colored differently from the first and second group of chromatic colors, and like sounding consonants are colored the same.

4. A dictionary as in claim 3 which is in the form of a book.

5. A book comprising text in the English language and a phonics dictionary therefor, the text being presented in color coded letter symbols comprising alphabet letters in distinctly different characteristic colors, wherein one multi-member group of chromatic colors is used for the pronunciations of each of a plurality of different consonant letters so colored and a second multi-member group of chromatic colors is used for the pronunciations of each of a plurality of different vowel letters so colored with the colored members of the second group of chromatic colors being visually distinct from the members of the first group of chromatic colors and each of the members of the first group of chromatic colors is visibly distinct from other members in that first group and each of the members of the second group of chromatic colors is visibly distinct from other members in that second group of chromatic colors and silent letters are written in black, and said phonics dictionary comprises alphabet letters in distinctly different characteristic colors wherein words are printed in order with each particular characteristic color of such letter corresponding to a particular pronunciation thereof and wherein each consonant letter pronounced by a sound other than the usual pronunciation of such consonant letter standing alone is, for each such different pronunciation thereof, chromatically colored differently from the color accorded such consonant letter standing alone and differently from the coloring accorded each other different pronunciation of such letter and chromatically colored differently from the first and second group of chromatic colors, and like sounding consonants are colored the same.

6. A book as in claim 5 wherein the language sounds are indicated by colored alphabet letters as set out in Table I following wherein the chromatically different colors are set out by arabic numerals, and the words illustrative of the pronunciation of such sounds are abreast of the arabic numeral indicating the color of the letter forming the symbol:

TABLE I

| LETTER | COLOR NUMBER | ILLUSTRATIVE WORD |
|---|---|---|
| Aa | 1 | ale, fate, snake, ape |
| Aa | 2 | am, can, fat, grass |
| Aa | 3 | sofa, idea, account |
| Aa | 4 | palace |
| Bb | 8 | baby, be, but |
| Cc | 6 | ocean, social |
| Cc | 5 | cello, child |
| Cc | 7 | cat, can, cup |
| Cc | 8 | cell, cease, cement |
| Dd | 7 | soldier, educate |
| Dd | 8 | day, den, do |
| Ee | 1 | he, she |
| Ee | 1 | end, met, pet |
| Ee | 3 | the, earth |
| Ee | 4 | they, prey |
| Ff | 7 | of |
| Ff | 8 | frog, fill |
| Gg | 6 | go, begin |
| Gg | 8 | gem, giant, religion |

| | | |
|---|---|---|
| GHgh | 7 | laugh, cough |
| Ii | 1 | ice, bite, idea |
| Ii | 2 | ill, pity, with |
| Ii | 3 | fir |
| Ii | 4 | unique, pique |
| Jj | 8 | joke, jolly, jump |
| Kk | 8 | keys, kick |
| Ll | 8 | late, leg, lip |
| Mm | 8 | man, mine, mold |
| Nn | 8 | no, man, many |
| Oo | 1 | old, note, row |
| Oo | 6 | to, two, food |
| Oo | 2 | odd, not, forest |
| Oo | 3 | demon, nation |
| Oo | 5 | wood, good |
| PHph | 7 | telephone, triumph |
| Pp | 8 | pat, pen, pin |
| Qq | 7 | quick, queen |
| Rr | 8 | run, rabbit |
| SHsh | 6 | sure, issue, mission |
| Ss | 7 | is, wise, lives, ears |
| Ss | 8 | sit, fast, seen |
| Tt | 6 | nation, action, caution |
| Tt | 5 | question, righteous |
| THth | 7 | then, with |
| Tt | 8 | time, talk, Thomas |
| Uu | 1 | cube, unite, menu, music |
| Uu | 6 | rude, blue, rumor |
| Uu | 3 | circus, under, up, picture |
| Vv | 8 | vote, vent, vile |
| Ww | 7 | want, win, wood |
| Xx | 7 | Xerox, xylophone |
| Xx | 8 | except, exit, exact |
| Yy | 1 | shy, by, cry |
| Yy | 7 | yet, yellow, yard |
| Zz | 8 | zone, haze | and wherein the colors corresponding to the arabic numbers indicating the color of the symbols are: 1. red; 2. orange; 3. tan; 4. pink; 5. brown; 6. purple; 7. green; 8. blue.

7. A process for encoding alphabet letters as pronunciation symbols for language sounds comprising chromatically coloring each consonant letter and each vowel letter in one of a plurality of distinctly different characteristic chromatic colors and each such letter is colored in more than one characteristic chromatic color with each different particular characteristic color of each such letter corresponding to a particular different pronunciation thereof, whereby to consistently distinguish between the several language sounds for each such chromatically colored letter.

8. Process for encoding alphabet letters as pronunciation symbols for language sounds comprising chromatically coloring each consonant letter and each vowel letter in one of a plurality of distinctly different characteristic chromatic colors and each such letter is colored in more than one characteristic chromatic color with each different particular characteristic color of each such letter corresponding to a particular different pronunciation thereof, said chromatic colors being chosen from a plurality of multi-member groups of chromatic colors, and wherein one multi-member group of chromatic colors is used for the pronunciations of each of a plurality of consonant letters so colored and a second multi-member group of chromatic colors used for the pronunciations of each of a plurality of different vowel letters so colored, with the colored members of the second group of chromatic colors being visually distinct from the members of the first group of chromatic colors and each of the members of the first group of chromatic colors is visibly distinct from other members in that first group and each of the members of the second group of chromatic colors is visibly distinct from other members in that second group of chromatic colors and silent letters are written in black and wherein each consonant letter pronounced by a sound other than the usual pronunciation of such consonant letter standing alone is, for each such different pronunciation thereof, chromatically colored differently from the color accorded such consonant letter standing alone and differently from the coloring accorded each other different pronunciation of such letter and chromatically colored differently from the first and second group of chromatic colors, and like sounding consonants are colored the same.

9. Process as in claim 8 wherein the language sounds are indicated by colored alphabet letters as set out in Table I following wherein the chromatically different colors are set out by arabic numerals, and the words illustrative of the pronunciation of such sounds are abreast of the arabic numeral indicating the color of the letter forming the symbol:

TABLE I

| LETTER | COLOR NUMBER | ILLUSTRATIVE WORD |
|---|---|---|
| Aa | 1 | ale, fate, snake, ape |
| Aa | 2 | am, can, fat, grass |
| Aa | 3 | sofa, idea, account |
| Aa | 4 | palace |
| Bb | 8 | baby, be, but |
| Cc | 6 | ocean, social |
| Cc | 5 | cello, child |
| Cc | 7 | cat, can, cup |
| Cc | 8 | cell, cease, cement |
| Dd | 7 | soldier, educate |
| Dd | 8 | day, den, do |
| Ee | 1 | he, she |
| Ee | 2 | end, met, pet |
| Ee | 3 | the, earth |
| Ee | 4 | they, prey |
| Ff | 7 | of |
| Ff | 8 | frog, fill |
| Gg | 6 | go, begin |
| Gg | 8 | gem, giant, religion |
| GHgh | 7 | laugh, cough |
| Ii | 1 | ice, bite, idea |
| Ii | 2 | ill, pity, with |
| Ii | 3 | fir |
| Ii | 4 | unique, pique |
| Jj | 8 | joke, jolly, jump |
| Kk | 8 | keys, kick |
| Ll | 8 | late, leg, lip |
| Mm | 8 | man, mine, mold |
| Nn | 8 | no, man, many |
| Oo | 1 | old, note, row |
| Oo | 6 | to, two, food |
| Oo | 2 | odd, not, forest |
| Oo | 3 | demon, nation |
| Oo | 5 | wood, good |
| PHph | 7 | telephone, triumph |
| Pp | 8 | pat, pen, pin |
| Qq | 7 | quick, queen |
| Rr | 8 | run, rabbit |
| SHsh | 6 | sure, issue, mission |
| Ss | 7 | is, wise, lives, ears |
| Ss | 8 | sit, fast, seen |
| Tt | 6 | nation, action, caution |
| Tt | 5 | question, righteous |
| THth | 7 | then, with |
| Tt | 8 | time, talk, Thomas |
| Uu | 1 | cube, unite, menu, music |
| Uu | 6 | rude, blue, rumor |
| Uu | 3 | circus, under, up, picture |
| Vv | 8 | vote, vent, vile |
| Ww | 7 | want, win, wood |
| Xx | 7 | Xerox, xylophone |
| Xx | 8 | except, exit, exact |
| Yy | 1 | shy, by, cry |
| Yy | 7 | yet, yellow, yard |
| Zz | 8 | zone, haze | and wherein the colors corresponding to the arabic numbers indicating the color of the symbols are: 1. red; 2. orange; 3. tan; 4. pink; 5. brown; 6. purple; 7. green; 8. blue.

* * * * *